Jan. 1, 1924
E. L. PFUNDER
COLLET CHUCK OPERATING MEANS
Filed Feb. 12, 1923
1,479,314
2 Sheets-Sheet 1
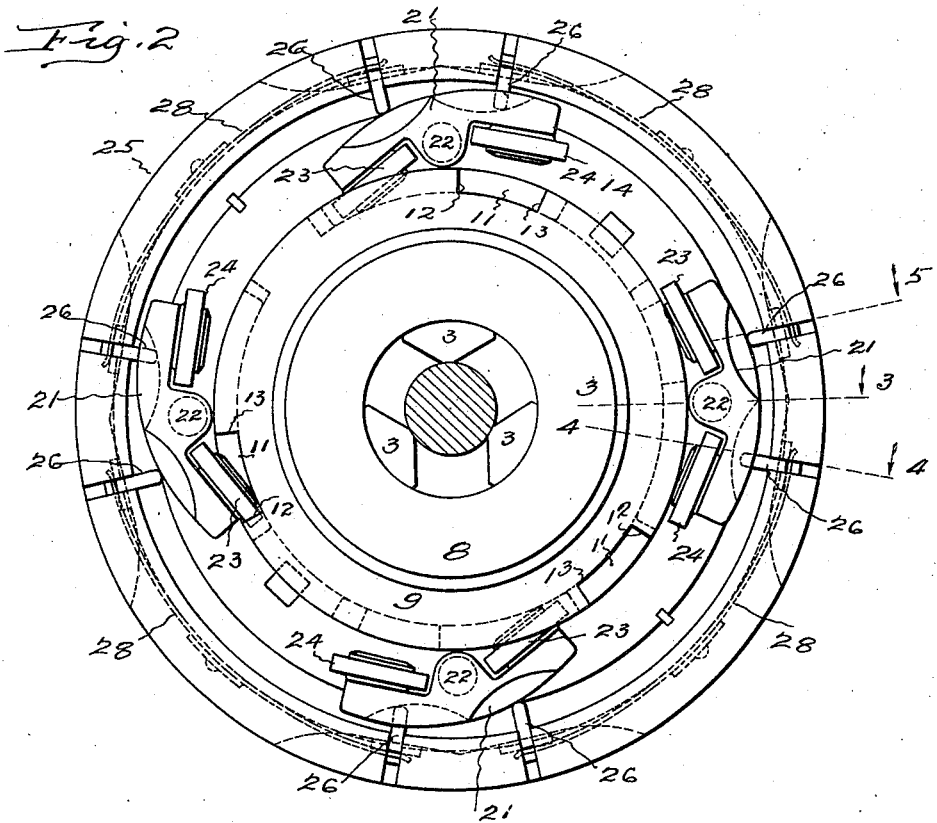
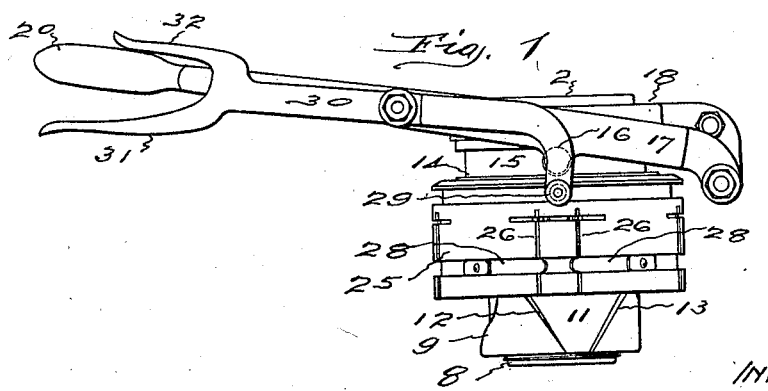
INVENTOR
Emil L. Pfunder
by Harry R. Williams
atty.

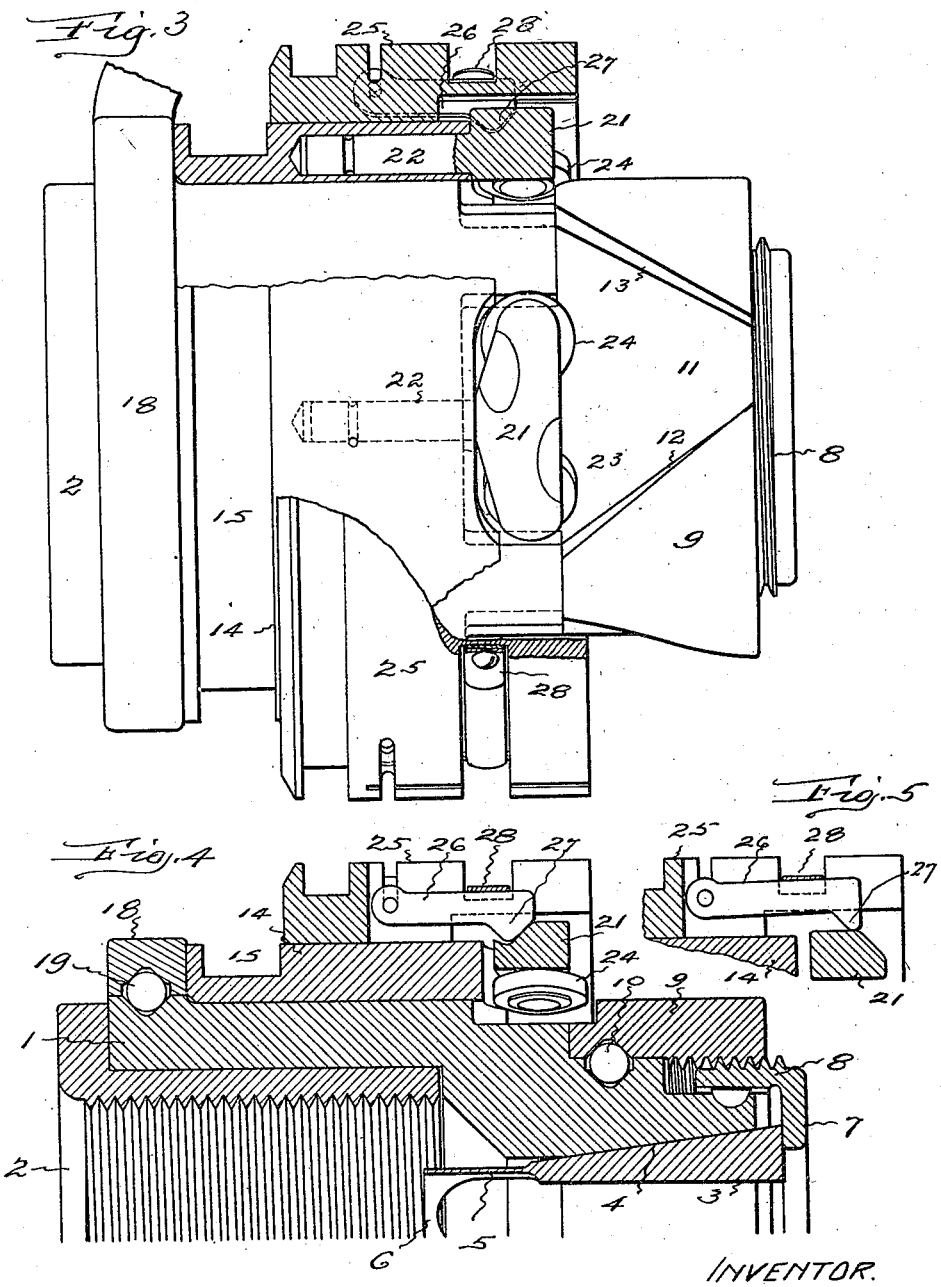

Patented Jan. 1, 1924.

1,479,314

UNITED STATES PATENT OFFICE.

EMIL L. PFUNDER, OF WINDSOR, CONNECTICUT, ASSIGNOR TO THE J. M. NEY COMPANY, OF HARTFORD, CONNECTICUT, A CORPORATION OF CONNECTICUT.

COLLET-CHUCK-OPERATING MEANS.

Application filed February 12, 1923. Serial No. 618,664.

*To all whom it may concern:*

Be it known that I, EMIL L. PFUNDER, a citizen of the United States, residing at Windsor, in the county of Hartford and State of Connecticut, have invented a new and useful Improvement in Collet-Chuck-Operating Means, of which the following is a specification.

This invention relates to means for operating chucks of the collet type, that is, chucks in which the holding jaws are formed from hardened spring metal and which open and close but slightly, interchangeable collets of various capacities for stock of different sizes and character being provided for one body, and which chucks are more especially designed for attachment to the arbor or spindle of a lathe, milling machine, screw machine or the like machine tool.

The object of the invention is to provide means which may be manipulated while the machine is running for powerfully closing the collet jaws upon or quickly opening the collet jaws from stock, regardless of variations in the size of the stock, within the maximum range of the collet.

This object is attained by arranging on a chuck body of this class reciprocatory means which when set in one position and reciprocated will ratchet a collet operating collar rotarily in one direction and cause the jaws to contract, and when set in another position and reciprocated will ratchet the collet operating collar rotarily in the opposite direction so as to permit the jaws to expand, the handles for setting and reciprocating the parts being associated so that the operations may be performed with one hand and practically coincidently.

In the accompanying drawings Figure 1 shows a plan of a chuck and operating mechanism which embodies the invention. Fig. 2 shows on larger scale a view of the front end of the chuck. Fig. 3 shows a top view of the chuck with portions cut away on the line 3—3 on Fig. 2. Fig. 4 shows a longitudinal section of a portion of the chuck on the line 4—4 on Fig. 2. Fig. 5 is a section on line 5 on Fig. 2.

The chuck illustrated is of the general character of that described in United States Patent No. 1,398,341 issued November 29, 1921. In this chuck there is a body 1 having a central opening that at the rear contains a threaded bushing 2 for the attachment of the chuck to the arbor or spindle of the machine with which it is to be used. At the front the opening in the body is tapering and in this section is located the collet which has holding jaws 3 the backs 4 of which are inclined to fit the tapering wall of the opening in the body. The jaws are connected by spring shanks 5 with a joining band 6 in a common way. The front ends of the collet jaws extend beyond the front end of the body and are adapted to be engaged by the flange 7 of the cap 8 that is keyed so as to slide longitudinally but not rotate on the end of the body. The cap has an exterior thread and engaging this thread is a thread in a collar 9 which is keyed by balls 10 so that it may rotate on but not move longitudinally on the end of the body. The rotation of the collar in one direction, as a result of the intermeshing threads, draws the cap in and causes the collet jaws to contract, while the rotation of the collar in the opposite direction carries the cap out and permits the collet jaws to expand. In the exterior of the collar are recesses 11 with walls 12 and 13 which are oblique with relation to each other and to the axis of the chuck.

Slidably mounted on the body is a sleeve 14. At the rear this sleeve has an annular groove 15 in which is fitted a roll 16 mounted on a lever 17. The lever at one end is pivoted to a non-rotating bracket 18 mounted on anti-friction bearings 19 on the body, and at the other end has a handle 20. By swinging this lever back and forth the sleeve 14 may be reciprocated longitudinally on the body. At the front end of this sleeve are yokes 21 which have stems 22 that are rotatably retained in sockets in the sleeve so that the yokes may be rocked transversely of the collar 9. Pivotally mounted on the ends of these yokes are rolls 23 and 24. When the yokes are swung so as to carry the rolls 23 radially inward, these rolls are in position to engage with the inclined walls 12 on one side of the recesses in the collar and ratchet the collar rotarily in one direction when the operating lever is swung back and forth. When the yokes are swung so as to carry the rolls 24 radially inward, these rolls are in position to engage the inclined walls 13 on the other side of the recesses in the collar, and as the sleeve and rolls are reciprocated, ratchet the collar rotarily in the other direction. In the form shown there are four sets of yokes and rolls on the operating sleeve and three recesses in the periphery of the collar, so that the rolls engage the inclined walls successively and not all at the same time, that is, on one reciprocation one roll will act and on the subsequent reciprocations the following rolls will act in sequence. This transforms the reciprocating movements of the actuating sleeve to step by step rotary movements of the collar which draws in and pushes out the cap that controls the collet.

Mounted to slide on the operating sleeve but rotate therewith is a selecting sleeve 25. In radial slots in this sleeve are tumblers 26 which have on their inner edges wedges 27 and that are yieldingly pressed inward by springs 28 arranged in circumferential slots in the selecting sleeve. There is a pair of tumblers for each yoke and the wedges on one of each pair are designed to be slid onto and off from the back edge of the outside of one end of the yokes, (Figs. 2, 4) and the wedges on the other of each pair of tumblers are designed to be slid onto and off from the front edge of the outside of the other end of the yokes. (Figs. 2, 5.) When the selecting sleeve 25 is moved forward one of each set of tumblers 26 are moved forward over the yokes and their wedges oscillate the yokes and press down the rolls 24 on one end, and when the selecting sleeve is moved backward the other of each set of tumblers 26 are drawn back over the yokes and their wedges oscillate the yokes and press down the rolls 23 on the other end. When the rolls 24 are pressed down they are in position to engage the inclined walls 13 of the collar 9 as the sleeve 14 is reciprocated, and when the rolls 23 are down they are adapted to engage the inclined walls 12 of the collar. When the rolls are pressed down only one at a time is in position to engage an inclined wall on the collar as the sleeves are reciprocated, the others that are pressed down either ride idly through the grooves or pass yieldingly over the periphery of the collar. In an annular groove in the periphery near the rear end of the selecting sleeve is a roll 29 on the end of a lever 30 that is pivoted to the operating lever. This selecting lever has two handles 31 and 32 adjacent to the handle of the operating lever.

When the selecting lever is swung to one position with relation to the operating lever and the operating lever is oscillated the rolls on the yokes are in such position that they engage the inclined walls on one side of the recesses in the collar and turn the collar in such direction that it draws in the cap and causes the collet jaws to contract in the recesses in the body. When the selecting lever is swung to the other position with relation to the operating lever and the operating lever is oscillated the rolls on the ends of the yokes are in position to engage the opposite inclined walls of the recesses in the collar and turn the collar in a direction which carries the cap out and allows the collet jaws to spring open.

The oscillation of the operating lever through the contact of the rolls with the inclined walls, ratchets the collar for closing the chuck when the selecting lever is in one position, and for opening the chuck when the selecting lever is in the other position. There is of course a neutral position for the selecting lever, and when in this position moving the operating lever effects no result. Both the operating lever and selecting lever are grasped by the same hand, and the selecting lever manipulated to cause the necessary rolls to move into functioning position and the operating lever then oscillated for ratcheting the collar by practically a single movement. With this mechanism a powerful closing and a quick opening of the jaws may be accomplished without interfering with the running of the machine to which the chuck is applied, thus much time is saved particularly when a large number of pieces of substantially the same size are to be held by the chuck.

The invention claimed is:—

1. The combination with a chuck of the character described of longitudinally movable means adapted to control the position of the collet, rotatable means for positioning said collet controlling means, and reciprocating means adapted to impart a step by step rotative movement to said rotatable means.

2. The combination with a chuck of the character described of longitudinally movable means adapted to control the position of the collet, rotatable means for positioning said collet controlling means, and adjustable reciprocating means adapted to impart a rotative movement to said rotatable means in either direction, said reciprocating means when in one adjustment being capable of imparting rotative movement to said rotatable means in one direction, and when in another adjustment being capable of imparting rotative movement to said rotatable means in the opposite direction.

3. The combination with a chuck of the character described of longitudinally movable means adapted to control the position of the collet, rotatable means for positioning said collet controlling means, reciprocating means adapted to impart step by step rotative movements to said rotatable means, and selective means carried by said reciprocating means adapted to determine the direction of the movements imparted to said rotatable means by said reciprocating means.

4. The combination with a chuck of the character described of longitudinally movable means adapted to control the position of the collet, rotatable means for positioning said collet controlling means, an operating sleeve mounted on the chuck body, means for reciprocating said sleeve, and means carried by said sleeve and adapted to engage said rotatable means and impart rotative movements thereto.

5. The combination with a chuck of the character described of longitudinally movable means adapted to control the position of the collet, rotatable means for positioning said collet controlling means, an operating sleeve mounted on the chuck body, means for reciprocating the operating sleeve, and adjustable means carried by said sleeve and adapted to engage said rotatable means and impart rotative movements thereto in opposite directions according to its adjustment.

6. The combination with a chuck of the character described of longitudinally movable means adapted to control the position of the collet, rotatable means for positioning said collet controlling means, an operating sleeve mounted on the chuck body, means for reciprocating the operating sleeve, means carried by the operating sleeve and adapted to engage said rotatable means and impart rotative movements thereto, a selecting sleeve mounted on the operating sleeve, and means on the selecting sleeve for determining the action of the means carried by the operating sleeve on said rotatable means.

7. The combination with a chuck of the character described of longitudinally movable means adapted to control the position of the collet, rotatable means for positioning said collet controlling means, an operating sleeve movable longitudinally on the chuck body, a selecting sleeve movable longitudinally on the operating sleeve, means for reciprocating the operating sleeve, means for reciprocating the selecting sleeve, adjustable means carried by the operating sleeve for engaging and imparting rotative movements to said rotatable means, and means carried by the selecting sleeve for adjusting said engaging means carried by the operating sleeve and determining the direction of rotative movement imparted to the rotatable means.

8. The combination with a chuck of the character described of a cap adapted to control the position of the collet, a collar having a threaded engagement with the cap and adapted to position the cap, said collar having grooves with walls oblique to the axis of the chuck, an operating sleeve, a lever for reciprocating the operating sleeve, oscillatory yokes carried by the operating sleeve, rolls mounted on the yokes and adapted to engage the oblique walls of the grooves in the collar, a selecting sleeve, means for reciprocating the selecting sleeve, and tumblers carried by the selecting sleeve and adapted to engage and oscillate the yokes according to the position of the selecting sleeve.

9. The combination with a chuck of the character described of a cap adapted to control the position of the collet, a collar having a threaded engagement with the cap and adapted to position the cap, said collar having walls oblique to the axis of the chuck, an operating sleeve, a lever for reciprocating the operating sleeve, transversely rocking yokes carried by the operating sleeve, rolls mounted on the ends of the yokes and adapted to engage said oblique walls, means for reciprocating the selecting sleeve, wedging tumblers carried by the selecting sleeve and adapted to engage the yokes, and springs for causing the tumblers to rock the yokes.

10. The combination with a chuck of the character described of a cap adapted to control the position of the collet, a collar having a threaded engagement with the cap and adapted to position the cap, said collar having walls oblique to the axis of the chuck, an operating sleeve, an operating handle for reciprocating the operating sleeve, transversely rocking yokes carried by the operating sleeve, rolls mounted on the yokes and adapted to engage said oblique walls, a selecting sleeve, a selecting handle pivoted on the operating handle for reciprocating the selecting sleeve, and means carried by the selecting sleeve and adapted to engage the yokes and rock them according to the position of the selecting sleeve.

11. The combination with a chuck of the character described of a longitudinally movable cap adapted to control the position of the collet, a rotatable collar threaded on said cap, an operating sleeve movable longitudinally on the chuck body, a selecting sleeve movable longitudinally on the operating sleeve, a lever for reciprocating the operating sleeve, a lever for reciprocating the selecting sleeve, adjustable means carried by the operating sleeve for engaging and imparting rotative movements to said collar in either direction, and means carried by the selecting sleeve for adjusting said adjustable means carried by the operating sleeve and determining the direction of rotative movement imparted to the collar.

12. The combination with a chuck of the character described of rotatable means for positioning the collet, reciprocating means adapted to impart a step by step rotative movement to said rotatable means in either direction, and an operating lever and a selecting lever for adjusting and operating said reciprocating means.

EMIL L. PFUNDER.